United States Patent [19]

Brandon

[11] Patent Number: 4,601,490

[45] Date of Patent: Jul. 22, 1986

[54] MULTI-COUPON SWEEPSTAKES PROMOTION VEHICLE

[75] Inventor: David A. Brandon, Plymouth, Mich.

[73] Assignee: George F. Valassis & Company, Livonia, Mich.

[21] Appl. No.: 541,784

[22] Filed: Oct. 13, 1983

[51] Int. Cl.$^4$ .......................... G09F 9/00; A63F 3/08
[52] U.S. Cl. ........................................ 283/56; 273/240
[58] Field of Search .................. 283/56, 51, 49, 48 R, 283/22; 40/124.1; 273/138 R, 139 R, 240, 269, 287

[56] References Cited

U.S. PATENT DOCUMENTS

| | | | |
|---|---|---|---|
| 1,096,565 | 5/1914 | Schoonmaker | 283/56 |
| 1,536,633 | 5/1925 | Sheffer | 283/56 |
| 2,251,781 | 8/1941 | Comens | 283/56 |
| 3,582,111 | 6/1971 | Siiter | 283/56 |
| 4,011,985 | 3/1917 | Simson | 283/56 |
| 4,195,864 | 4/1980 | Morton et al. | 283/56 |
| 4,307,900 | 12/1981 | Krautsack | 283/56 |
| 4,342,457 | 8/1982 | Small | 273/240 |

Primary Examiner—Paul A. Bell
Assistant Examiner—Paul M. Heyrana, Sr.
Attorney, Agent, or Firm—Krass and Young

[57] ABSTRACT

A sweepstakes promotion vehicle employs a description section containing graphics and text pertaining to the sweepstakes, a sweepstakes entry blank, a region containing a series of graphic descriptions of products, and a plurality of detachable product stamps. Each of the product stamps is detachably secured in proximity to the graphic description of the product associated with that stamp. The sweepstakes entry blank includes a game card having a plurality of spaces, each space adapted to receive a particular product stamp associated with the specific product. To complete the sweepstakes entry blank, a participant must detach the product stamps located contiguous to the product descriptions and affix the stamps in the appropriate space on the game card.

6 Claims, 3 Drawing Figures

MULTI-COUPON SWEEPSTAKES PROMOTION VEHICLE

TECHNICAL FIELD

This invention relates generally to advertising or promotional vehicle containing detachable coupons and more particularly to a sweepstakes promotion entry form containing detachable product stamps which are used in the completion of the entry form.

BACKGROUND ART

Contests, sweepstakes and other price giveaway events are commonly employed as means for promoting the sale of a particular line of products. Sweepstakes promotions and the entry blanks therefor are usually accompained by advertisements for one or more of the sponsor's products. It is hoped that the attention gained by the inducement of promotional give-aways will directly or indirectly result in the consumer's awareness of the sponsors' products. State laws prohibit sponsors of sweepstakes promotions from requiring any payment, such as purchase of one or more of the sponsors products, as a prerequisite for entering the sweepstakes. It is therefore essential that the sponsor associate his product line with the promotional sweepstakes in such a way that a potential participant will become exposed to the sponsor's product promotion in the process of exposure to the sweepstakes notice and completion of the entry blank.

Another common method for promoting the sale of a particular product or product line is the use of detachable discount coupons which are distributed in concert with advertising through direct mail, local newspapers, magazines and point-of-sale displays for the purpose of promoting a sale of that item. The coupons may be detached from the advertising literature and taken to the local retail outlet or mailed to the manufacturer of the product for a "cents-off" or other type of discount in the purchase of the associated item.

Another promotional coupon vehicle which is associated with the advertisement for a particular product line is disclosed in U.S. Pat. No. 4,307,900 issued to Krautsack. The Krautsack device employs a coupon vehicle which contains an illustration of the product and a description of the particular discount offer and a separate surface area which is deliniated to receive one or more portions of the packaging material of the product line. The portion of the packaging material required is detached from the product after it is purchased and is affixed in this surface region on the coupon. When each of the surface regions has been filled with a portion of the packaging material, the coupon may be redeemed for a discount on the next item purchased. It should be noted that this type of promotional coupon is unacceptable for use in a sweepstakes promotion because it requires purchase of the products in order to obtain the portion of packaging material required for completion of the coupon.

DISCLOSURE OF THE INVENTION

In one aspect of the invention a sweepstakes promotion vehicle is provided comprising a description section containing graphics and text pertaining to the sweepstakes, a sweepstakes entry blank, a region containing a series of graphic descriptions of products and a plurality of product stamps, each of which is detachably secured in proximity to the graphic description of the product associated with that stamp. The sweepstakes entry blank includes a game card having one or more spaces adapted to receive the product stamp associated with a specific product. In order to complete the entry blank the participant must detach the product stamps which are located contiguous to the product descriptions and affix the stamps in the appropriate space on the game card. Thus, while minimal effort is required to complete the entry blank, the participant's attention is directly or indirectly focused upon each of the product descriptions that is contiguous to the product stamps as she detaches those stamps from their respective areas. The sponsor is thus assured that all who enter the sweepstakes are at least momentarily exposed to the promotional graphics associated with the sponsors' products without requiring the participant to perform an act which might be considered "payment" for entering the sweepstakes.

BEST MODE FOR CARRYING OUT THE INVENTION

Figure 1:
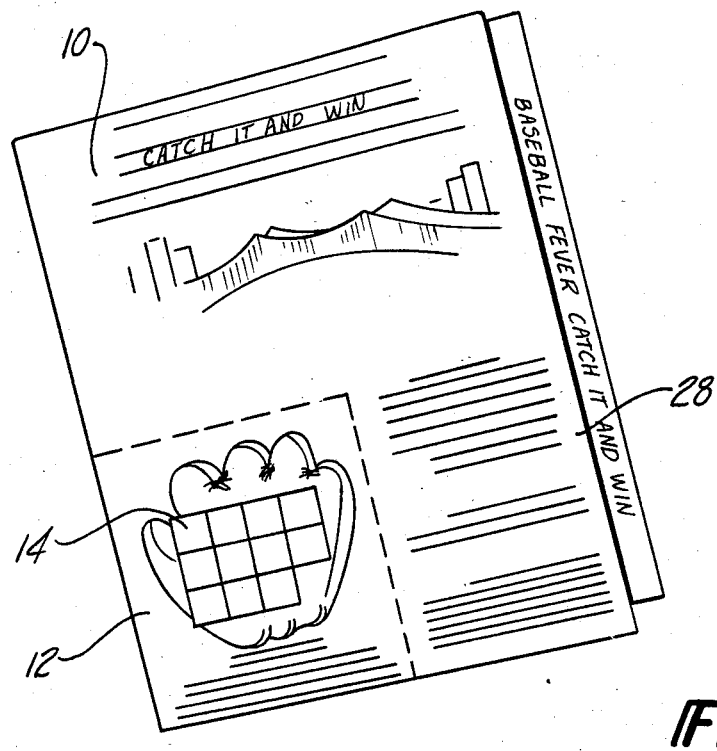
FIG. 1 is a perspective view illustrating the sweepstakes form and entry blank.
Figure 2:
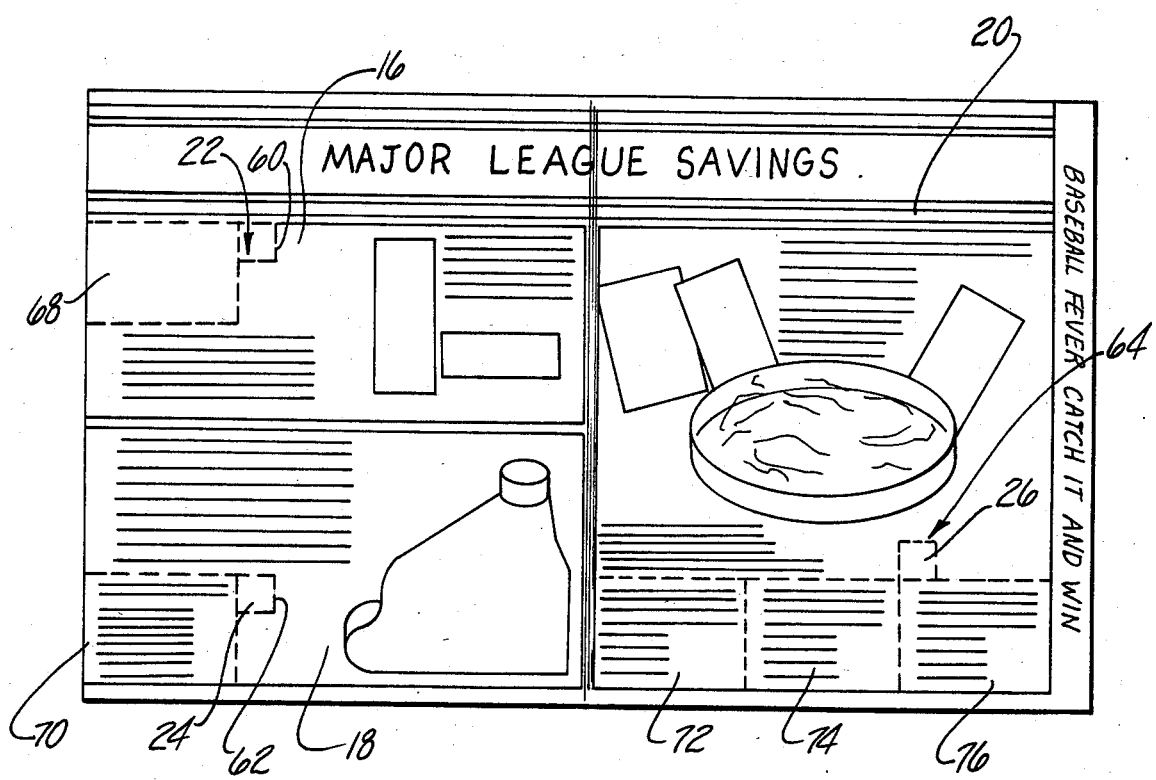
FIG. 2 is the front view of two facing pages of the promotional device, including graphic descriptions of various products and detachable product stamps.

Referring to FIGS. 1 and 2, a sweepstakes vehicle is shown employing a description section 10 containing graphics pertaining to the sweepstakes, a sweepstakes entry blank 12, including a game card portion having a plurality of spaces 14, a region containing a series of graphic descriptions of products 16–20, and plurality of product stamps 22–26 located in proximity to the graphic product descriptions 16–20. Each of the product stamps 22–26 is detachably secured at their respective locations, and may be removed for placement in the appropriate space 14 on the game card.

The sweepstakes description section 10 preferably includes a section of text comprising the official sweepstakes rules 28 as well as a general description of the prizes to be given the winners of the sweepstakes.

Each of the product stamps 22–26 are detachable from the product description graphics on the dotted lines 60 which outline the boundary of the stamp. The boundaries marked by the dotted lines 60–64 are preferably perforated for easy removal. Each of the stamps 22–26 or the product stamp spaces 14 or both are preferably provided with a gummed adhesive to facilitate ready attachment of the individual product stamps 22–26 in the spaces 14.

In operation, an individual, upon reading the sweepstakes promotion information 10 and sweepstakes rules 28, will proceed to search through the rest of the sweepstakes form to locate the product stamps 22–26. In the process of searching for the product stamps 22–26, the reader will be exposed to the graphic descriptions of the various products 16–20. The amount of time that F the reader is exposed to various product descriptions 16–20 is extended by virtue of the fact that the reader must take a minimum amount of time to detach each of the product stamps 22–26 from their respective locations. While the location, detachment and subsequent relocation of the product stamps 22-26 in the spaces 14 on the entry blank 12 require a minimal effort not likely to be construed as payment for entering the sweepstakes, the product stamps 22-26 provide a vehicle for insuring that participants will be momentarily exposed to each of the product description areas 16-20.

Figure 3:
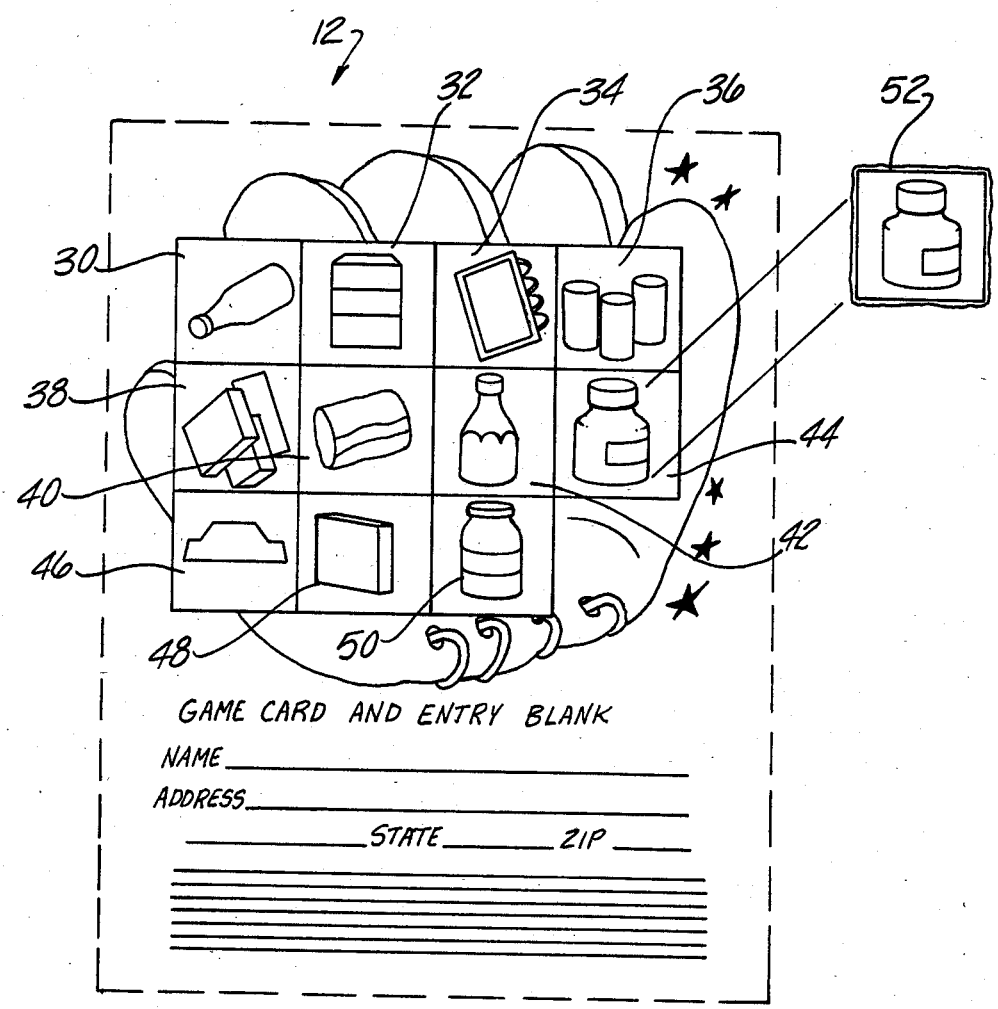
FIG. 3 is an enlarged view of the game card and entry blank shown in FIG. 1, with graphics pertaining to various products in each of the spaces.

Referring to FIG. 3, each of the product stamp spaces 30-50 is preferably provided with graphic indicia corresponding to one particular product stamp located elsewhere in the sweepstakes form. In the preferred embodiment, each of the product stamp spaces 30-50 is provided with a unique graphic indicia of one of the particular products described in the product description sections 16-20. This indicia may be identical to the indicia contained on one of the particular product stamps or may be a textual reference to one of the products identified by a particular product stamp. In addition to identifying the particular space 44 corresponding to the product stamp 52 for which the space is adapted, the inclusion of product indicia in each of the spaces 30-50 enhances the participant's awareness of each of the individual products as the participant is completing the entry blank 12.

Referring again to FIG. 2, one or more detachable discount coupons 68-76, each preferably redeemable at retail stores for specified values, may be included in each of the product description areas 16-20 in proximity to the product stamps 22-26. As with the product stamps 22-26, the coupons 68-76 are preferably perforated at their edges for eacy detachment. However, it should be noted that the coupons 68-76 and the product stamps 22-26 may be detachably affixed to the sweepstakes form by means of an adhesive without departing from the invention.

Thus, the sweepstakes promotion vehicle disclosed by the present invention insures that participants, in the process of completing the sweepstakes entry requirements, will be exposed to each of the individual product descriptions for a considerable length of time during the detachment of the various product stamps located throughout the form. Product identification indicia is also preferably provided in each of the product stamp spaces 30-50 and product stamps 22-26 to add to the participants' awareness of each of the individual products.

I claim:

1. A multi-page sweepstakes promotion vehicle comprising:

a description section containing graphics pertaining to the sweepstakes, including the official sweepstakes rules;

a sweepstakes entry blank including a game card having a plurality of spaces with each space bearing a graphic indicia of a specific product;

a multi-page region, separate from the portion of said vehicle containing said description section and said entry blank, containing a series a graphic descriptions of products;

a plurality of product stamps respectively associated with a plurality of products and each bearing a graphic indicia of the respective associated product; and means detachably securing said stamps in spaced relation within said multi-page region with each stamp positioned within said multi-page region in respective proximity to the graphic description of the specific product associated with that stamp, whereby, in order to complete the entry blank, the participant must search the multi-page region to locate the various product stamps located in spaced relation within the multi-page region corresponding to the specific products identified in the game card spaces, thereafter detach each of the located product stamps from their locations contiguous to the corresponding product descriptions, and thereafter affix the product stamps in the corresponding spaces located on the game card.

2. The sweepstakes promotion vehicle of claim 1 wherein one or more of the product descriptions include detachable discount coupons which are freely redeemable for purchase discounts on the associated product at various retail stores.

3. The sweepstakes promotion vehicle of claim 1 wherein the sweepstakes is based upon a particular central theme and one or more of the product descriptions contain references to that theme.

4. The sweepstakes promotion vehicle of claim 3 wherein the central theme is major league baseball.

5. The sweepstakes promotion vehicle of claim 1 wherein the sheets of the multi-page product description region are folded in half about their length to form the multi-page vehicle.

6. A multi-page sweepstakes promotion vehicle comprising:

a description section containing graphics pertaining to the sweepstakes, including the official sweepstakes rules;

a sweepstakes entry blank including a game card having a plurality of spaces with each space bearing a graphic indicia of a specific product;

a multi-page region, separate from the portion of said vehicle containing said description section and said entry blank, containing a series of graphic descriptions of products;

a plurality of product stamps, equal or greater in number than the minimum number of stamps required to complete the sweepstakes entry blank, respectively associated with a plurality of products and each bearing a graphic indicia of the respective associated product;

means detachably securing said stamps in spaced relation within said multi-page region with each stamp positioned within said multi-page region in respective proximity to the graphic description of the specific product associated with that stamp;

a plurality of discount coupons respectively associated with a plurality of products; and means respectively detachably securing said discount coupons in spaced relation within said multi-page region with each discount coupon positioned within said multi-page region in respective proximity to the graphic description of the specific product associated with that coupon and in proximity to the product stamp corresponding to the specific product associated with that coupon;

whereby, in order to complete the entry blank, the participant must search the multi-page region to locate the various product stamps positioned in spaced relation within the multi-page region and corresponding to the specific products identified in the game card spaces, thereafter detach each of the located product stamps from their locations contiguous to the corresponding product descriptions and the corresponding discount coupons, and thereafter affix the product stamps in the corresponding spaces located on the game card.

* * * * *